(12) United States Patent
Suzuki et al.

(10) Patent No.: US 10,825,482 B2
(45) Date of Patent: Nov. 3, 2020

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suzuki, Kanagawa (JP); Kouichi Toukairin, Kanagawa (JP); Hisashi Hasegawa, Kanagawa (JP); Masaya Kudo, Kanagawa (JP); Kenji Hayasaka, Tokyo (JP); Yusuke Nojima, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/558,238

(22) Filed: Sep. 2, 2019

(65) Prior Publication Data
US 2020/0286527 A1 Sep. 10, 2020

(30) Foreign Application Priority Data

Mar. 8, 2019 (JP) .................. 2019-042705

(51) Int. Cl.
| | | |
|---|---|---|
| *G11B 33/02* | (2006.01) | |
| *G11B 23/04* | (2006.01) | |
| *G11B 23/03* | (2006.01) | |
| *G11B 33/12* | (2006.01) | |
| *G11B 5/48* | (2006.01) | |
| *G11B 5/55* | (2006.01) | |

(52) U.S. Cl.
CPC .......... *G11B 33/022* (2013.01); *G11B 5/4846* (2013.01); *G11B 5/5573* (2013.01); *G11B 23/0315* (2013.01); *G11B 23/0316* (2013.01); *G11B 23/045* (2013.01); *G11B 33/126* (2013.01); *G11B 33/128* (2013.01)

(58) Field of Classification Search
CPC ........................... G11B 33/022; G11B 5/4846
USPC ...................................... 360/99.18
See application file for complete search history.

(56) References Cited

U.S. PATENT DOCUMENTS

| | | | | | |
|---|---|---|---|---|---|
| 5,081,552 | A | * | 1/1992 | Glaser .................. | G11B 25/043 360/903 |
| 5,677,811 | A | * | 10/1997 | Kuno .................... | G11B 25/043 360/99.2 |
| 6,011,666 | A | * | 1/2000 | Wakamatsu ........... | G11B 19/04 360/69 |

(Continued)

FOREIGN PATENT DOCUMENTS

| | | |
|---|---|---|
| JP | S60-77096 | 5/1985 |
| JP | H03-124393 | 12/1991 |

*Primary Examiner* — Allen T Cao
(74) *Attorney, Agent, or Firm* — Kim & Stewart LLP

(57) ABSTRACT

A magnetic disk device includes a casing having a box-like base that has a bottom wall and a cover that has a first surface facing the bottom wall, a magnetic disk provided in the casing, a head configured to write data to the magnetic disk and to read data from the magnetic disk, an actuator assembly that supports the head in the casing, a conductive container on the first surface of the cover, and a conductive body in contact with the conductive container and the cover.

18 Claims, 12 Drawing Sheets

(56) References Cited

U.S. PATENT DOCUMENTS

| | | | | |
|---|---|---|---|---|
| 6,862,176 | B1* | 3/2005 | Codilian | G11B 33/022 360/99.18 |
| 8,477,451 | B2* | 7/2013 | Lee | G11B 33/148 360/99.18 |
| 2003/0218827 | A1* | 11/2003 | Teo | G11B 25/043 360/99.18 |
| 2005/0180044 | A1* | 8/2005 | Lee | G11B 25/043 360/97.12 |
| 2007/0153414 | A1* | 7/2007 | Sullivan | G06F 1/20 360/99.18 |
| 2007/0268620 | A1 | 11/2007 | Nakajima | |
| 2012/0133278 | A1* | 5/2012 | Ryu | H01L 27/3276 313/512 |
| 2013/0222947 | A1* | 8/2013 | Sugii | G11B 23/505 360/99.08 |
| 2017/0294215 | A1* | 10/2017 | Yamasaki | G11B 33/1466 |
| 2019/0362868 | A1* | 11/2019 | Yamagishi | H01B 7/02 |

\* cited by examiner

MAGNETIC DISK DEVICE

This application is based upon and claims the benefit of priority from Japanese Patent Application No. 2019-042705, filed Mar. 8, 2019, the entire contents of which are incorporated herein by reference.

FIELD

Embodiments described herein relate generally to a magnetic disk device.

BACKGROUND

A magnetic disk device has a conductive container that is provided in a casing and that accommodates a hygroscopic material. When this container is installed near a head, static electricity with which the container is charged is discharged to the head, possibly damaging the head. Furthermore, when the container comes in contact with a component in the casing at a time of installing the container in the casing in an assembly process of the magnetic disk device, the component might become contaminated.

DETAILED DESCRIPTION

Embodiments provide a magnetic disk device capable of improving reliability.

In general, according to one embodiment, a magnetic disk device includes a casing having a box-like base that has a bottom wall and a cover that has a first surface facing the bottom wall, a magnetic disk provided in the casing, a head configured to write data to the magnetic disk and to read data from the magnetic disk, an actuator assembly that supports the head in the casing, a conductive container on the first surface of the cover, and a conductive body in contact with the conductive container and the cover.

According to another embodiment, a magnetic disk device includes a casing having a box-like base that has a bottom wall and a cover that has a first surface facing the bottom wall, a magnetic disk rotatably provided in the casing, a head configured to write data to the magnetic disk and to read data from the magnetic disk, an actuator assembly that supports the head in the casing, a flexible printed circuit board electrically connected to the actuator assembly, a conductive container for storing hygroscopic material, adhesively bonded to the first surface by an insulating adhesive member and located between the actuator assembly and the flexible printed circuit board, and a conductive body that is formed integrally with the container and comes in contact with the cover.

According to yet another embodiment, a magnetic disk device includes a casing having a box-like base that has a bottom wall and a cover that has a first surface facing the bottom wall, a magnetic disk rotatably provided in the casing, a head configured to write data to the magnetic disk and to read data from the magnetic disk, an actuator assembly that supports the head in the casing, a flexible printed circuit board electrically connected to the actuator assembly, a conductive container for storing hygroscopic material, adhesively bonded to the first surface by an insulating adhesive member and located between the actuator assembly and the flexible printed circuit board, and a conductive body located between the first surface of the cover and the container.

Embodiments will be described hereinafter with reference to the drawings. It is noted that the drawings are given as an example only and do not limit the scope of the disclosure.

First Embodiment

Figure 1:
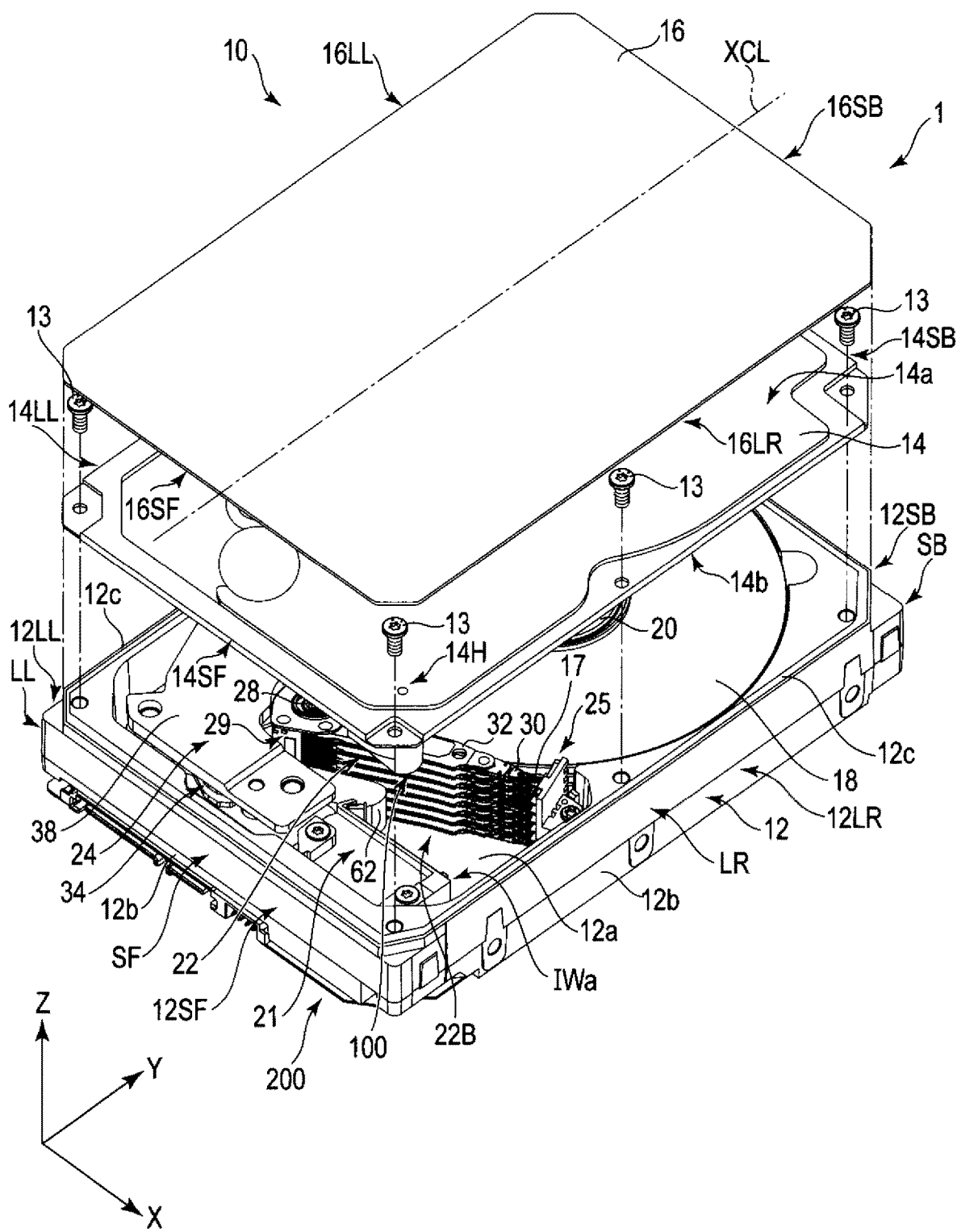
FIG. 1 is an exploded perspective view depicting an example of an internal structure of a magnetic disk device according to a first embodiment.

FIG. 1 is an exploded perspective view depicting an example of an internal structure of a magnetic disk device 1 according to a first embodiment. A first direction X, a second direction Y, and a third direction Z are orthogonal to one another. It is noted, however, that the first direction X, the second direction Y, and the third direction Z may intersect one another at an angle other than 90 degrees. The first direction X and the second direction Y correspond to, for example, a direction parallel to a principal surface of the magnetic disk device 1 and a direction parallel to a facing surface that faces the principal surface. The third direction Z corresponds to, for example, a thickness direction of the magnetic disk device 1. A length in the first direction X is often referred to as "width", hereinafter.

The magnetic disk device 1 includes a generally rectangular casing 10. The casing 10 has an open rectangular box-like base 12, an inner cover 14 screwed on the base 12 by a plurality of screws 13 and closing an opening of the base 12, and an outer cover 16 that is superimposed on the inner cover 14 and having a peripheral portion welded to the base 12. Hereinafter, a direction toward which a tip end of an arrow of the third direction Z is pointing, that is, a direction from the base 12 to the inner cover 14 or the outer cover 16 is often referred to as "cover side", and an opposite direction to the direction toward which the tip end of the arrow of the third direction Z is pointing, that is, a direction from the inner cover 14 or the outer cover 16 to a bottom wall 12a is often referred to as "base side".

The casing 10 has a pair of short side walls SF and SB opposite to each other and a pair of long side walls LL and LR opposite to each other. In the casing 10, the short side walls SF and SB extend along the first direction X, and the long side walls LR and LL extend along the second direction Y. The long side wall LR is disposed to be apart from the long side wall LL in a direction toward which a tip end of an arrow of the first direction X is pointing. The short side wall SB is disposed to be apart from the short side wall SF in a direction toward which a tip end of an arrow of the second direction Y is pointing. FIG. 1 depicts a central axis XCL passing through a center of a width of the short side walls SF and SB of the casing 10. The central axis XCL corresponds to, for example, a center of a width of the base 12, a center of a width of the inner cover 14, and a center of a width of the outer cover 16. It is noted that the central axis XCL may deviate from the center of the width of the base 12, deviate from the center of the width of the inner cover 14, or deviate from the center of the width of the outer cover 16.

The base 12 has the rectangular bottom wall 12a and a side wall 12b. In the base 12, the bottom wall 12a and the side wall 12b are molded integrally by, for example, aluminum. The bottom wall 12a faces the inner cover 14 at a gap given therebetween. The bottom wall 12a has a planar surface in, for example, the first direction X and the second direction Y. The side wall 12b is provided to be raised along a periphery of the bottom wall 12a. The side wall 12b is formed, for example, to protrude from the periphery of the bottom wall 12a in the third direction Z. The side wall 12b includes a pair of long side walls 12LR and 12LL opposite to each other and a pair of short side walls 12SF and 12SB opposite to each other. For example, the short side walls 12SF and 12SB extend in the first direction X, and the long side walls 12LR and 12LL extend in the second direction Y. The long side wall 12LR is apart from the long side wall 12LL in the direction toward which the tip end of the arrow of the first direction X is pointing. The short side wall 12SB is apart from the short side wall 12SF in the direction toward which the tip end of the arrow of the second direction Y is pointing. A generally rectangular frame-like fixed rib 12c is provided to protrude from a cover-side end surface of the side wall 12b.

The inner cover 14 is formed with, for example, stainless steel and formed into a rectangular shape. The inner cover 14 includes a pair of long sides (or end portions) 14LR and 14LL opposite to each other and a pair of short sides (or end portions) 14SF and 14SB opposite to each other. For example, the short sides 14SF and 14SB extend in the first direction X, and the long sides 14LR and 14LL extend in the second direction Y. The long side 14LR is apart from the long side 14LL in the direction toward which the tip end of the arrow of the first direction X is pointing. The short side 14SB is apart from the short side 14SF in the direction toward which the tip end of the arrow of the second direction Y is pointing. A peripheral portion of the inner cover 14 is screwed on the cover-side end surface of the side wall 12b of the base 12 by the screws 13 and fixed to an inner side of the fixed rib 12c. The inner cover 14 has a principal surface 14a, a facing surface 14b opposite to the principal surface 14a, and a hole 14H penetrating through the principal surface 14a and the facing surface 14b. The facing surface 14b faces the bottom wall 12a.

The outer cover 16 is formed with, for example, aluminum and formed into a rectangular shape. The outer cover 16 is formed to be slightly larger in plane dimensions than the inner cover 14. The outer cover 16 includes a pair of long sides (or end portions) 16LR and 16LL opposite to each other and a pair of short sides (or end portions) 16SF and 16SB opposite to each other. For example, the short sides 16SF and 16SB extend in the first direction X, and the long sides 16LR and 16LL extend in the second direction Y. The long side 16LR is apart from the long side 16LL in the direction toward which the tip end of the arrow of the first direction X is pointing. The short side 16SB is apart from the short side 16SF in the direction toward which the tip end of the arrow of the second direction Y is pointing. The outer cover 16 faces the principal surface 14a of the inner cover 14. A peripheral portion of the outer cover 16 is welded to the fixed rib 12c of the base 12 over an entire periphery, so that the outer cover 16 is fixed airtight to the base 12. Low-density gas (e.g., inert gas), which is, for example, helium gas, lower in density than air is filled in the casing 10. The long side wall LR includes the long side wall 12LR and the long sides 14LR and 16LR, and the long side wall LL includes the long side wall 12LL and the long sides 14LL and 16LL. The short side wall SF includes the short side wall 12SF and the short sides 14SF and 16SF, and the short side wall SB includes the short side wall 12SB and the short sides 14SB and 16SB.

A plurality of, for example, five to nine magnetic disks 18 (hereinafter, simply referred to as "disks") serving as recording mediums and a spindle motor 20 serving as a drive unit that supports and rotates the disks 18 are provided in the casing 10. The spindle motor 20 is disposed on the bottom wall 12a (in particular, an inner surface IWa of the bottom wall 12a). Each disk 18 has a magnetic recording layer on each of or one of a cover-side principal surface and a facing surface opposite to this principal surface. The disks 18 are fitted into a hub, not depicted, of the spindle motor 20 coaxially with one another and clamped by a clamp spring to be fixed to the hub. The disks 18 are thereby supported to be in parallel to the bottom wall 12a of the base 12. The disks 18 are each rotated at a predetermined rotational speed by the spindle motor 20.

While the five to nine disks 18 are accommodated in the casing 10 in the present embodiment, the number of the disks 18 is not limited to five to nine and may be larger or smaller than five to nine. Alternatively, a single disk 18 may be accommodated in the casing 10.

A plurality of magnetic heads (hereinafter, simply referred to as "heads") 17 each writing data to one disk 18 and reading data from the disk 18, and an actuator assembly 22 supporting these heads 17 to be movable relatively to the magnetic disks 18 are provided in the casing 10. The actuator assembly 22 is rotatably supported by a bearing unit 28. The bearing unit 28 has a pivot on the bottom wall 12a of the base 12 near outer peripheries of the disks 18, a plurality of bearings attached to the pivot, spacers disposed between the bearings, and the like.

Furthermore, a voice coil motor (hereinafter referred to as "VCM") 24 that controls motions such as rotation and positioning of the actuator assembly 22, a ramp load mechanism 25 that holds each head 17 at an unloaded position apart from one disk 18 when the head 17 moves to an outermost circumference of the disk 18, and a flexible printed circuit (FPC) unit (FPC unit) 21 are provided in the casing 10. The FPC unit 21 is electrically connected to the actuator assembly 22. The FPC unit 21 includes flexible printed circuit (FPC) boards. These FPC boards are electrically connected to the heads 17 and a voice coil 34 of the VCM 24 via a relay FPC 62 on the actuator assembly 22. The voice coil 34 is located between a pair of yokes 38, and the voice coil 34, these yokes 38, and a magnet fixed to any of the yokes 38 configure the VCM 24. The FPC unit 21 is electrically connected to a printed circuit board 200 via, for example, a connector. The control circuit board 200 is attached to an outer side of the casing 10, for example, a facing surface side opposite to a principal surface of the bottom wall 12a.

The actuator assembly 22 includes an actuator block 29, the bearing unit 28 provided in the actuator block 29, a plurality of arms 32 that extend from the actuator block 29, and suspension assemblies that extend from the respective arms 32. One head 17 is supported on a tip end portion of each suspension assembly 30. The actuator assembly 22 causes the VCM 24 to drive the head 17 to a predetermined position of one disk 18.

Moreover, a hygroscopic portion 100 having a hygroscopic function is provided in the casing 10. The hygroscopic portion 100 is attached to the facing surface 14b of the inner cover 14 in the casing 10. The hygroscopic portion 100 faces the hole 14H of the inner cover 14 from the base side. Furthermore, the hygroscopic portion 100 faces the bottom wall 12a from the cover side and is apart from the bottom wall 12a. It is noted that the hygroscopic portion 100 may come in contact with the bottom wall 12a. The hygroscopic portion 100 is located near the long side wall LR in the first direction X and near the short side wall SF in the second direction Y. The hygroscopic portion 100 is located, for example, closer to the long side wall LR than the central axis XCL in the first direction X and located between the FPC unit 21 and the actuator assembly in the second direction Y. In other words, the hygroscopic portion 100 is located between the FPC unit 21 and the actuator assembly 22 that is in a state of being held by the ramp load mechanism 25. For example, the hygroscopic portion 100 absorbs or adsorbs moisture of gas flowing in and out via the hole 14H and moisture in the casing 10.

Figure 2:
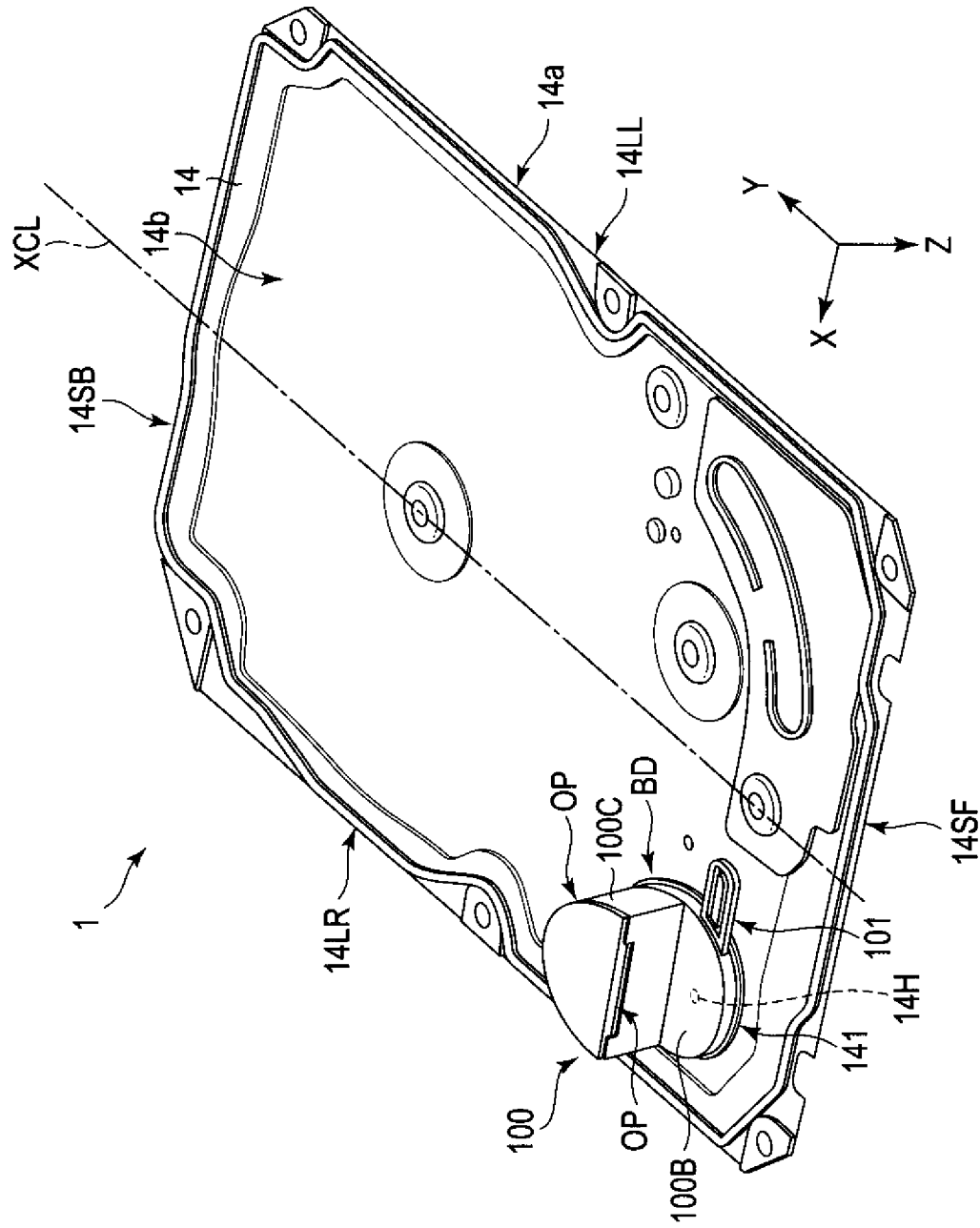
FIG. 2 is a perspective view depicting an example of an inner cover viewed from a surface to which a hygroscopic portion is attached.

FIG. 2 is a perspective view depicting an example of the inner cover 14 viewed toward the facing surface 14b to which the hygroscopic portion 100 is attached. FIG. 2 depicts only configurations necessary for explanation.

An attachment portion 141 is formed on the facing surface 14b of the inner cover 14 in such a manner as to be more swollen on the base side than surroundings. The hole 14H is formed in the attachment portion 141. In the example depicted in FIG. 2, the attachment portion 141 is located near the long side 14LR in the first direction X and near the short side 14SF in the second direction Y. The attachment portion 141 corresponds to, for example, a region, depicted in FIG. 2, of the inner cover 14 where the hygroscopic portion 100 is attached. It is noted that the attachment portion 141 is not necessarily provided.

The hygroscopic portion 100 has a container portion BD and an extension portion 101 connected to the container portion BD. The container portion BD is formed with a conductive material, for example, a conductive resin. The container portion BD is attached to the facing surface 14b of the inner cover 14. In the example depicted in FIG. 2, the container portion BD is attached to the attachment portion 141 on the facing surface 14b of the inner cover 14. The container portion BD has a seat portion 100B, an accommodation portion 100C, and a lid 100L (see FIG. 3). The lid 100L is formed with a conductive material and contains, for example, carbon. The seat portion 100B is formed with a conductive material, for example, a conductive resin. The seat portion 100B is provided, for example, to face the FPC unit 21 in the casing 10. The accommodation portion 100C is formed with a conductive material, for example, a conductive resin. The seat portion 100B and the accommodation portion 100C are formed with, for example, the same material. It is noted that the seat portion 100B and the accommodation portion 100C may be formed with, for example, different materials. The accommodation portion 100C is formed integrally with the seat portion 100B and protrudes more greatly to the base side than the seat portion 100B. The accommodation portion 100C is provided, for example, to be located between the FPC unit 21 and the actuator assembly 22 and to face (the inner surface IWa of) the bottom wall 12a in the casing 10. The accommodation portion 100C is apart from (the inner surface IWa of) the bottom wall 12a. It is noted that the accommodation portion 100C may come in contact with (the inner surface IWa of) the bottom wall 12a. The lid 100L is attached to the base side of the accommodation portion 100C. Openings OP from which the gas or the like flows in and out are formed between the accommodation portion 100C and the lid 100L. As described later in detail, the gas flowing in via the hole 14H depicted in FIG. 1, for example, flows into the casing 10 from the openings OP via the accommodation portion 100C. In addition, the gas in the casing 10, for example, flows into the accommodation portion 100C via the openings OP.

The extension portion 101 is formed with a conductive material, for example, a conductive resin. It is noted that the extension portion 101 may be formed with either the same material as or a different material from that of the container portion BD. The extension portion 101 is formed integrally with the container portion BD and extends from the container portion BD in one direction. The extension portion 101 is located inside a peripheral portion (long sides 14LL and 14LR and the short sides 14SF and 14SB) of the inner cover 14. In the example depicted in FIG. 2, the extension portion 101 is connected to the seat portion 100B and extends from the seat portion 100B toward the central axis XCL in the first direction X. It is noted that the hygroscopic portion 100 may have a plurality of extension portions 101. The extension portion 101 may be connected to the accommodation portion 100C and extend from the accommodation portion 100C in one direction. The extension portion 101 may extend to a side other than the central axis XCL in the first direction X. Furthermore, the hygroscopic portion 100 does not necessarily include the extension portion 101. In other words, the container portion BD and the extension portion 101 may be formed separately. The extension portion 101 is, for example, brought into contact with or connected to the container portion BD and extends in one direction.

Figure 3:
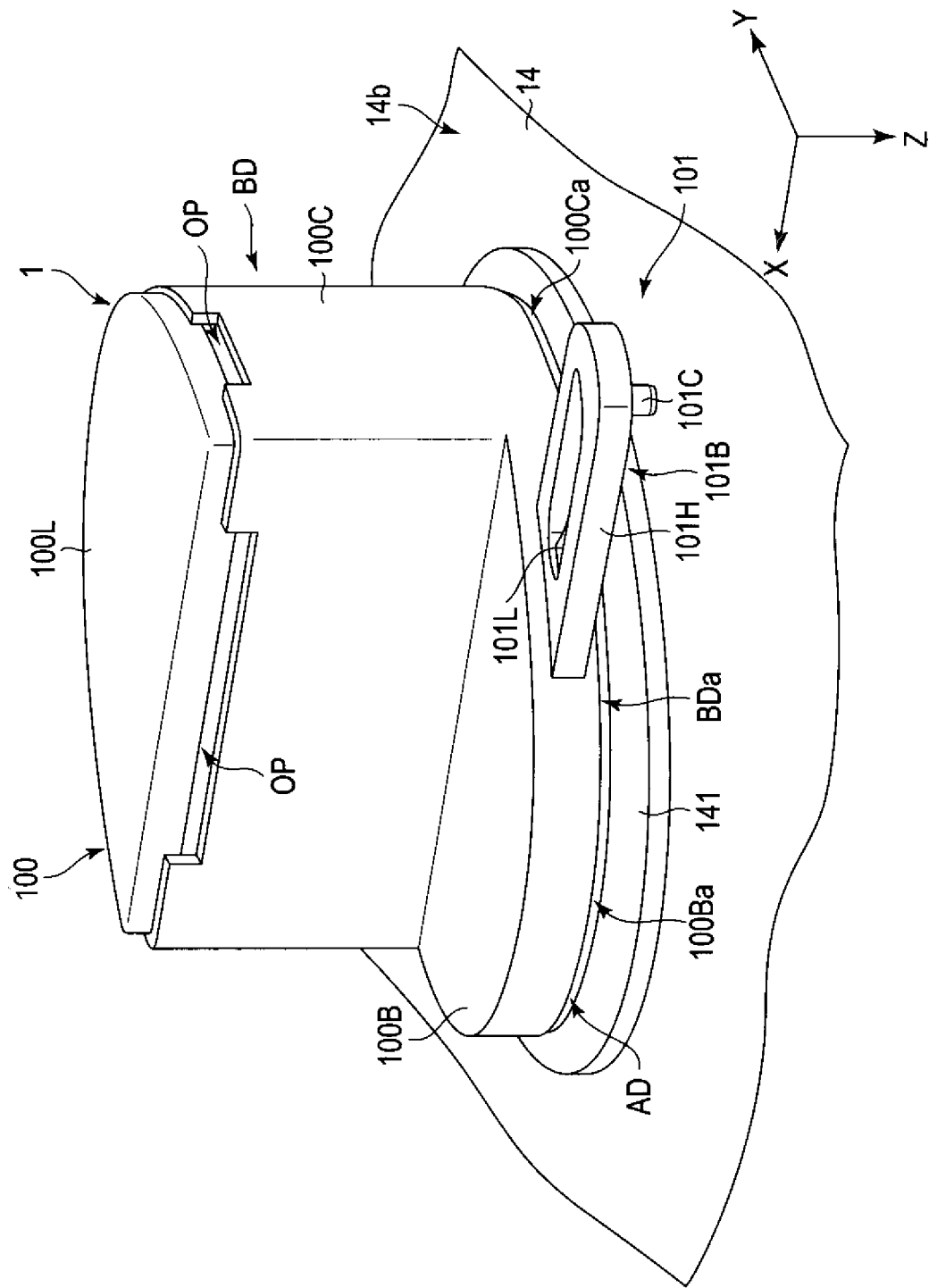
FIG. 3 is an enlarged perspective view depicting an example of a configuration of the hygroscopic portion according to the first embodiment.

FIG. 3 is an enlarged perspective view depicting an example of a configuration of the hygroscopic portion 100 according to the first embodiment.

A cover-side principal surface BDa of the container portion BD is adhesively bonded to the facing surface 14b of the inner cover 14 by an adhesive member AD. The principal surface BDa of the container portion BD corresponds to a cover-side principal surface of the hygroscopic portion 100. The principal surface BDa of the container portion BD includes a cover-side principal surface 100Ba of the seat portion 100B and a cover-side principal surface 100Ca of the accommodation portion 100C. The adhesive member AD is formed with an insulating material. The adhesive member AD is, for example, an insulating double-sided tape. It is noted that the adhesive member AD may be an insulating adhesive. Alternatively, the adhesive member AD may have conductivity.

The extension portion 101 comes in contact with the facing surface 14b of the inner cover 14. The extension portion 101 has a plate portion 101B and a projection portion 101C protruding from the plate portion 101B and coming in contact with the inner cover 14. In the example depicted in FIG. 3, the plate portion 101B is connected to the seat portion 100B and extends in an opposite direction to the direction toward which the tip end of the arrow of the first direction X is pointing. The plate portion 101B has a hollow plate portion 101H having a hollow portion and a plate spring portion 101L formed in the hollow portion of the hollow plate portion 101H. The hollow plate portion 101H is connected to the seat portion 100B and extends in the opposite direction to the direction toward which the tip end of the arrow of the first direction X is pointing. The hollow portion of the hollow plate portion 101H is formed to be long and narrow in the opposite direction to the direction toward which the tip end of the arrow of the first direction X is pointing. The plate spring portion 101L is connected to an inner wall of the hollow plate portion 101H and extends in the same direction as that in which the hollow plate portion 101H extends. The plate spring portion 101L is formed to be long and narrow in the opposite direction to the direction toward which the tip end of the arrow of the first direction X is pointing. The projection portion 101C protrudes from a tip end of the plate portion 101B in the opposite direction to the direction toward which the tip end of the arrow in the first direction X is pointing, to the cover side in the third direction Z, and comes in contact with the inner cover 14. In the example depicted in FIG. 3, the projection portion 101C protrudes from a tip end of the plate spring portion 101L in the opposite direction to the direction toward which the tip end of the arrow in the first direction X is pointing, to the cover side in the third direction Z, and comes in contact with the facing surface 14b of the inner cover 14.

Figure 4:
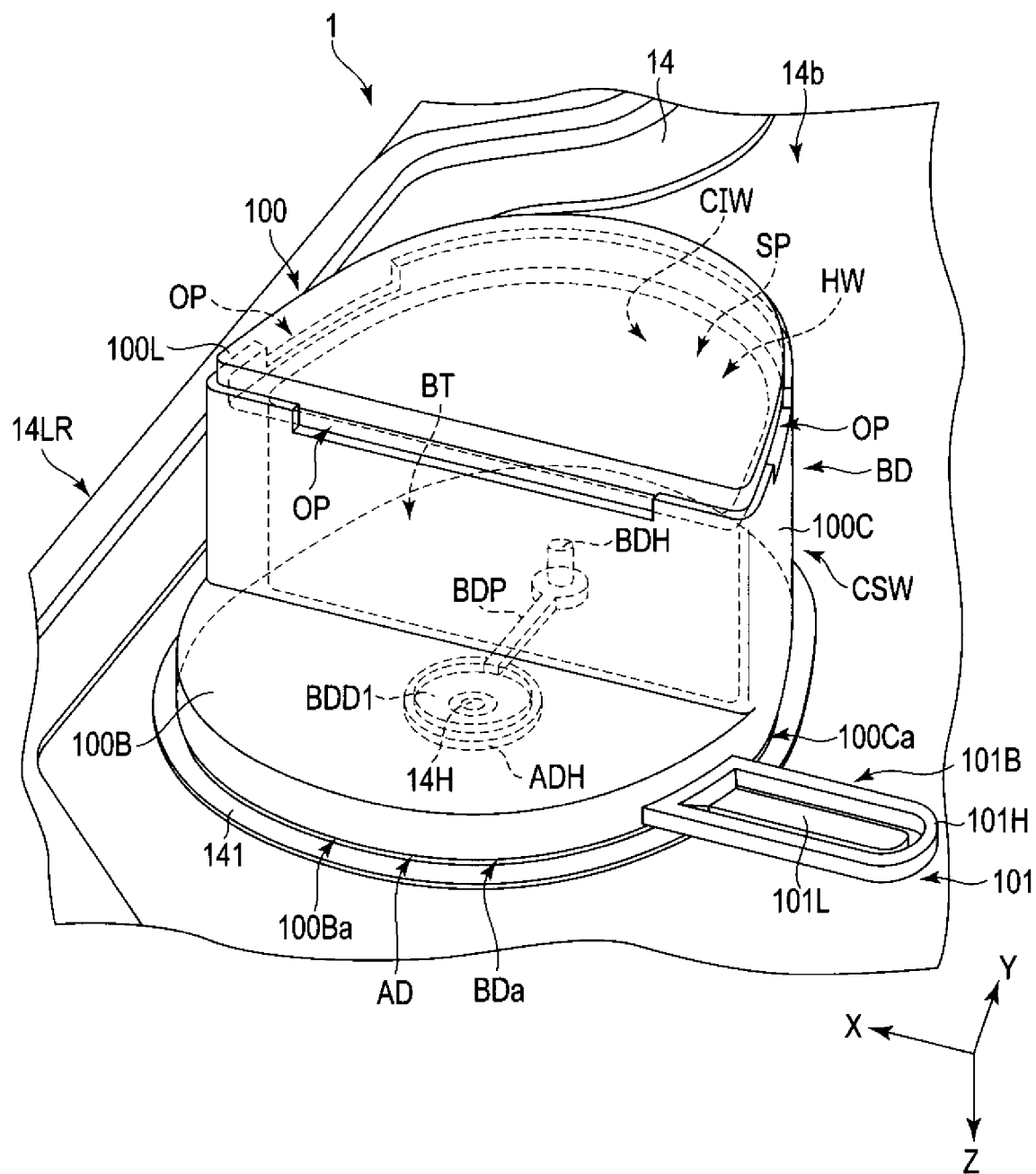
FIG. 4 is an enlarged perspective view depicting an example of the configuration of the hygroscopic portion according to the first embodiment.

FIG. 4 is an enlarged perspective view depicting an example of the configuration of the hygroscopic portion 100 according to the first embodiment.

The adhesive member AD has a through-hole ADH. The through-hole ADH faces the hole 14H. In other words, the hole 14H communicates with the through-hole ADH. The container portion BD has a depressed portion BDD1 that faces the hole 14H via the through-hole ADH, and a passage BDP that communicates with the depressed portion BDD1. In other words, the depressed portion BDD1 faces the through-hole ADH and the hole 14H in the third direction Z. The depressed portion BDD1 and the passage BDP are formed on the principal surface BDa-side of the container portion BD. In the example depicted in FIG. 4, the depressed portion BDD1 is formed by depressing the principal surface 100Ba of the seat portion 100B in a base-side direction. Furthermore, the passage BDP is formed, for example, by depressing the principal surface BDa of the container portion BD in the base-side direction.

The accommodation portion 100C has a bottom portion BT attached to the inner cover 14, a side wall CSW extending from the bottom portion BT to the base side, and a hygroscopic material HW. The accommodation portion 100C is open to the base side. A space SP surrounded by the lid 100L that closes an opening of the accommodation portion 100C, an inner wall CIW that is an inner side of the side wall CSW, and the bottom portion BT is formed inside the accommodation portion 100C. The hygroscopic material HW which is, for example, activated carbon or silica is filled into the space SP. At least one through-hole BDH that penetrates through the principal surface 100Ca of the accommodation portion 100C is formed in the bottom portion BT. The through-hole BDH communicates with the passage BDP. In the example depicted in FIG. 4, the through-hole BDH is formed in the bottom portion BT of the accommodation portion 100C. The through-hole BDH communicates with the passage BDP. The gas flowing through the hole 14H flows into the space SP of the accommodation portion 100C through the through-hole ADH, the depressed portion BDD1, the passage BDP, and the through-hole BDH. The gas flowing into the space SP of the accommodation portion 100C flows into the casing 10 from the openings OP after the hygroscopic material accommodated in the space SP absorbs or adsorbs moisture and the like of the gas. Moreover, the gas flowing into the space SP of the accommodation portion 100C from the openings OP flows out into the casing 10 from the openings OP after the hygroscopic material accommodated in the space SP absorbs or adsorbs moisture and the like.

Figure 5:
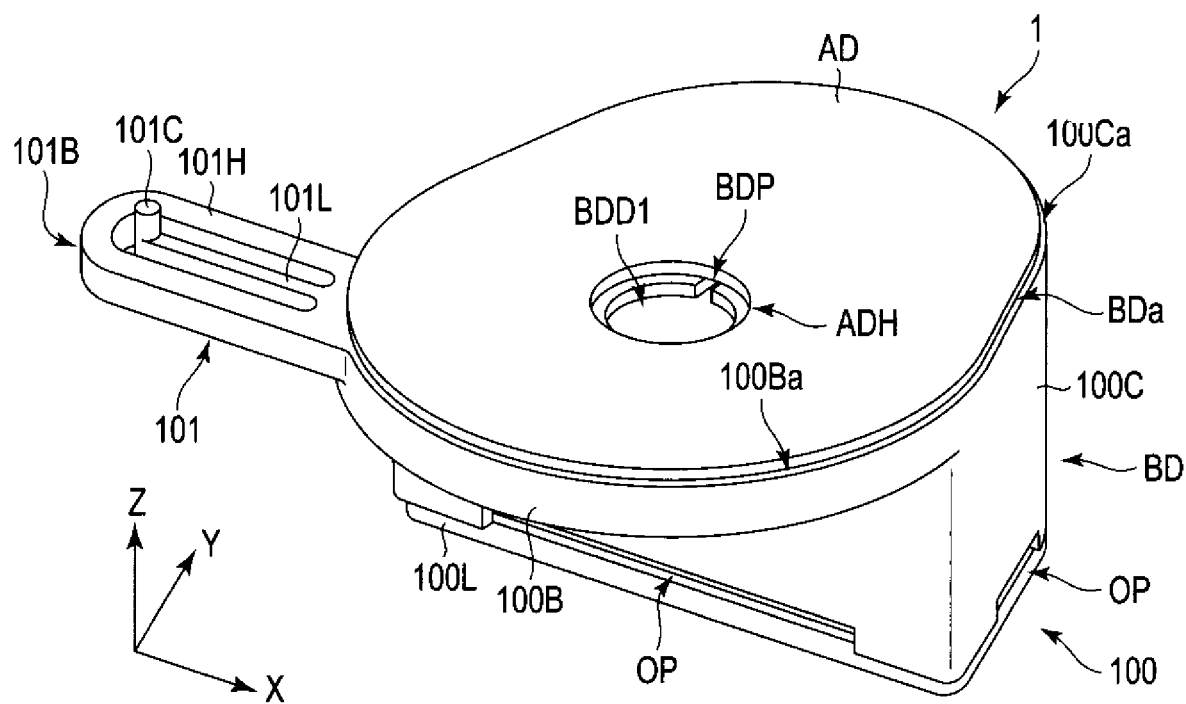
FIG. 5 is a perspective view depicting an example of an adhesive member and the hygroscopic portion viewed from a cover side.

FIG. 5 is a perspective view depicting an example of the adhesive member AD and the hygroscopic portion 100 viewed from the cover side.

The through-hole ADH of the adhesive member AD is superimposed on the depressed portion BDD1. In the example depicted in FIG. 5, a diameter of the through-hole ADH is larger than that of the depressed portion BDD1. It is noted that the diameter of the through-hole ADH may be smaller than or equal to that of the depressed portion BDD1. The depressed portion BDD1 communicates with the passage BDP. Furthermore, the adhesive member AD covers at least part of the passage BDP.

According to the present embodiment, the magnetic disk device 1 has the hygroscopic portion 100 that is attached to the facing surface 14b of the inner cover 14 in the casing 10. The hygroscopic portion 100 is located, for example, between the FPC unit 21 and the actuator assembly that is held by the ramp load mechanism 25. The hygroscopic portion 100 has the container portion BD and the extension portion 101 extending from the container portion BD. The container portion BD and the extension portion 101 are formed with the conductive material. The container portion BD is adhesively bonded to the facing surface 14b of the inner cover 14 by the insulating adhesive member AD. The container portion BD has the seat portion 100B, the accommodation portion 100C, and the lid 100L. The accommodation portion 100C is formed integrally with the seat portion 100B and protrudes more greatly to the base side than the seat portion 100B. The lid 100L is attached to the base side of the accommodation portion 100C and closes the opening of the accommodation portion 100C. The extension portion 101 extends from the seat portion 100B. The extension portion 101 has the plate portion 101B and the projection portion 101C protruding from the tip end of the plate portion 101B to the base side. The projection portion 101C comes in contact with the inner cover 14. Since the projection portion 101C comes in contact with the inner cover 14 in this way, the magnetic disk device 1 can release static electricity with which the hygroscopic portion 100 is charged to ground via the inner cover 14, the base 12, and the like. Accordingly, the magnetic disk device 1 can prevent the static electricity with which the hygroscopic portion 100 is charged from being discharged to the head 17. The magnetic disk device 1 can, therefore, improve reliability.

Furthermore, since the hygroscopic portion 100 is only adhesively bonded to the inner cover 14 by the adhesive member AD, it is possible to easily install the hygroscopic portion 100 and to mitigate restrictions on a shape and a magnitude. Accordingly, it is possible to constrain a cost for manufacturing the magnetic disk device 1.

Furthermore, the plate portion 101B has the hollow plate portion 101H having the hollow portion and the plate spring portion 101L formed in the hollow portion of the hollow plate portion 101H. The projection portion 101C protrudes from the tip end of the plate portion 101B to the cover side, and comes in contact with the inner cover 14. Providing the projection portion 101C on the tip end of the plate spring portion 101L in this way makes it possible to reduce a repelling force generated on the base side by the contact of the projection portion 101C with the inner cover 14. Accordingly, the magnetic disk device 1 is capable of reducing a force that possibly causes peel-off of the adhesive member AD. The magnetic disk device 1 can, therefore, improve the reliability.

Magnetic disk devices according to modifications and other embodiments will next be described. In the modifications and the other embodiments, same parts as those in the first embodiment described above are denoted by the same reference signs and detailed descriptions thereof are omitted.

First Modification

The magnetic disk device 1 in a first modification differs in a configuration of the extension portion 101 from the magnetic disk device 1 in the first embodiment.

Figure 6:
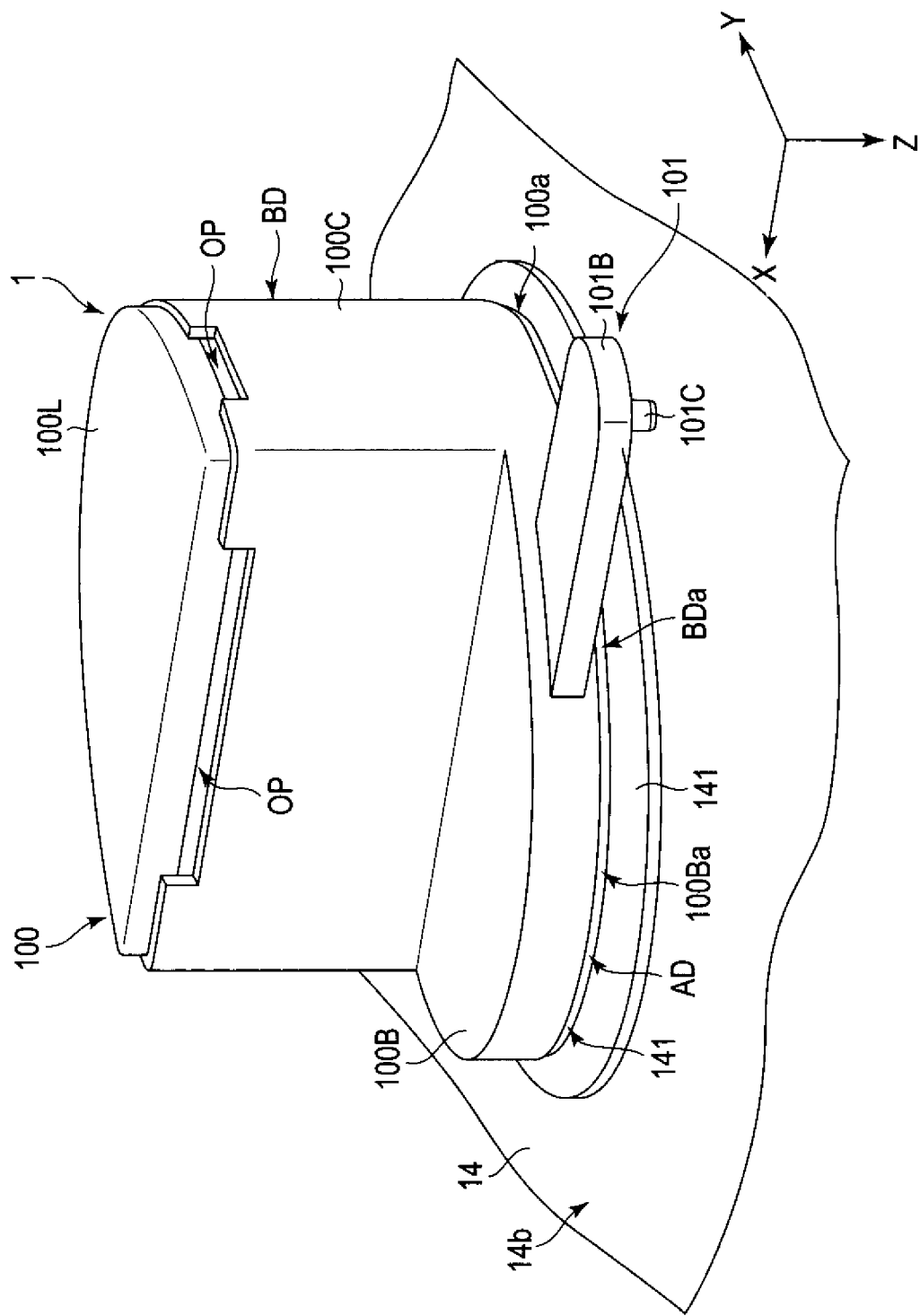
FIG. 6 is an enlarged perspective view depicting an example of a configuration of a hygroscopic portion according to a first modification.

FIG. 6 is an enlarged perspective view depicting an example of the configuration of the hygroscopic portion 100 according to the first modification.

The extension portion 101 has the plate portion 101B and the projection portion 101C. In the example depicted in FIG. 6, the projection portion 101C protrudes from the tip end of the plate portion 101B to the cover side in the third direction Z, and comes in contact with the inner cover 14.

According to the first modification, the extension portion 101 has the plate portion 101B and the projection portion 101C protruding from the tip end of the plate portion 101B to the base side. The projection portion 101C comes in contact with the inner cover 14. Since the projection portion 101C comes in contact with the inner cover 14 in this way, the magnetic disk device 1 can release the static electricity with which the hygroscopic portion 100 is charged to ground via the inner cover 14, the base 12, and the like. Accordingly, the magnetic disk device 1 can prevent the static electricity with which the hygroscopic portion 100 is charged from being discharged to the head 17. The magnetic disk device 1 can, therefore, improve the reliability.

Second Embodiment

The magnetic disk device 1 in a second embodiment differs in a configuration of the hygroscopic portion 100 from the magnetic disk devices 1 in the first embodiment and the first modification.

Figure 7:
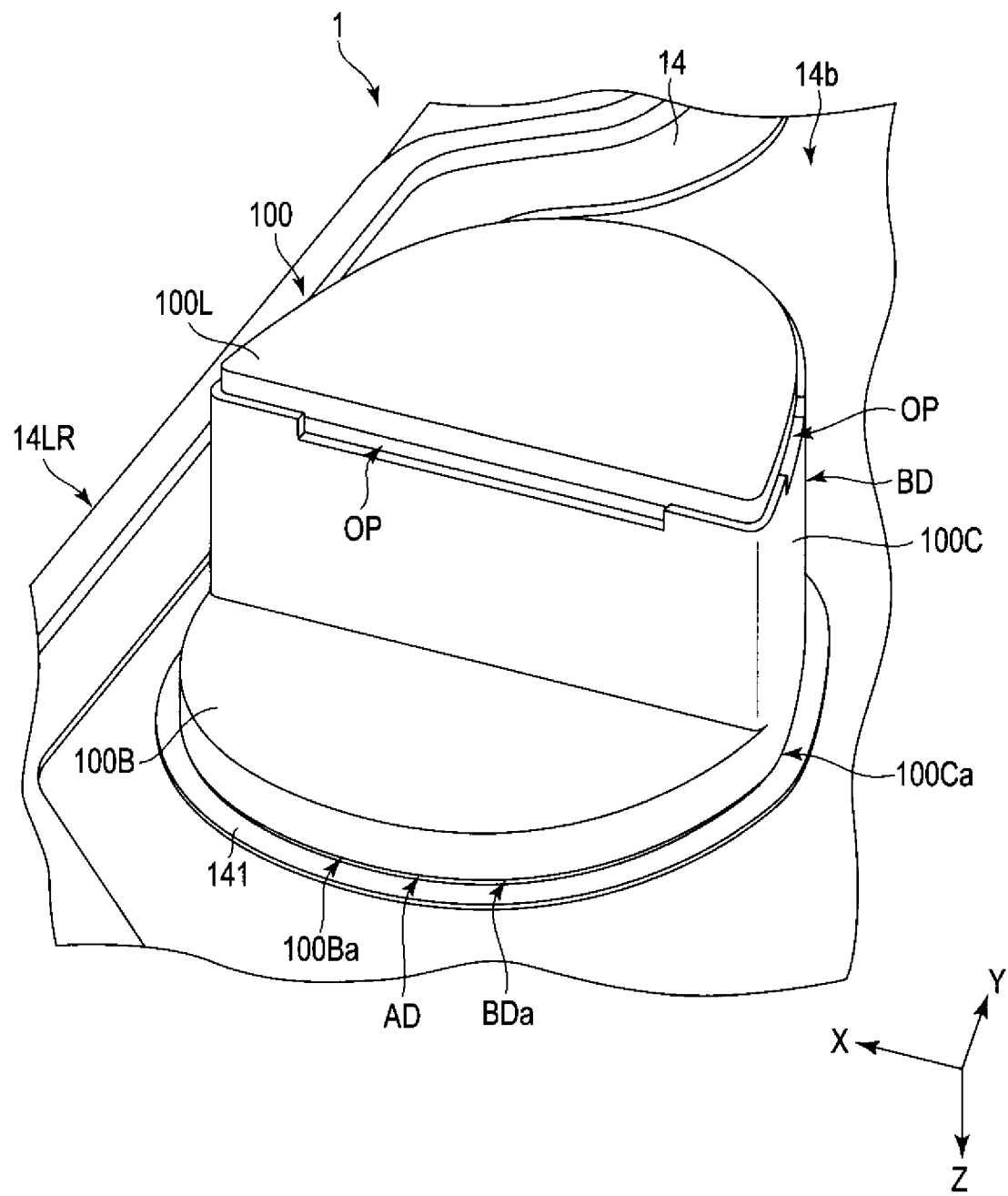
FIG. 7 is an enlarged perspective view depicting an example of a configuration of a hygroscopic portion according to a second embodiment.

FIG. 7 is an enlarged perspective view depicting an example of the configuration of the hygroscopic portion 100 according to the second embodiment.

The hygroscopic portion 100 has the container portion BD. The container portion BD is adhesively bonded to the facing surface 14b of the inner cover 14 by the adhesive member AD.

Figure 8:
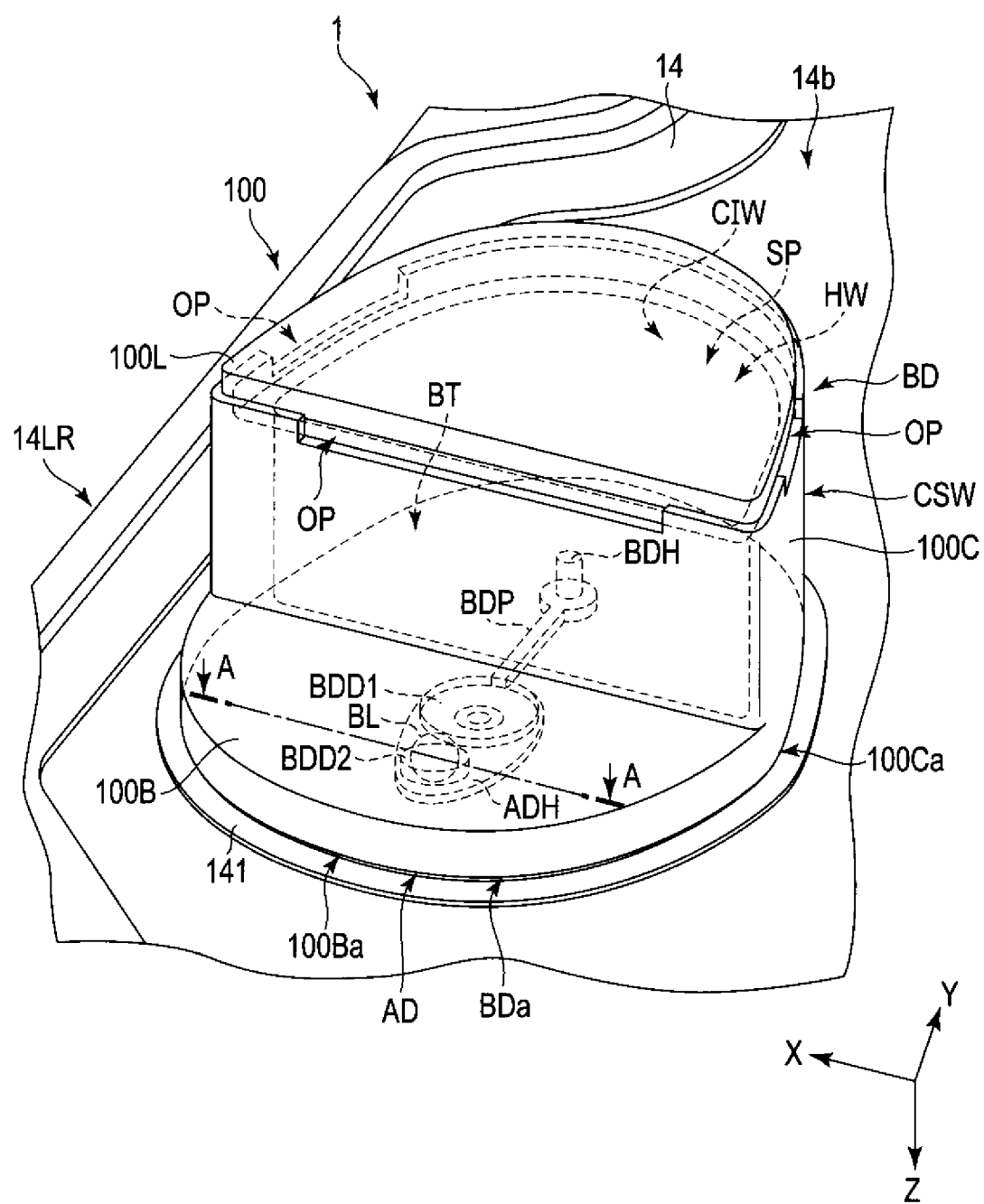
FIG. 8 is an enlarged perspective view depicting an example of the configuration of the hygroscopic portion according to the second embodiment.

FIG. 8 is an enlarged perspective view depicting an example of the configuration of the hygroscopic portion 100 according to the second embodiment.

The container portion BD has a depressed portion BDD2 that faces the facing surface 14b of the inner cover 14 via the through-hole ADH of the adhesive member AD. In other words, the depressed portion BDD2 faces the through-hole ADH and the facing surface 14b in the third direction Z. The depressed portion BDD2 is formed on the principal surface BDa-side of the container portion BD and located apart from the depressed portion BDD1. In the example depicted in FIG. 8, the depressed portion BDD2 is formed by depressing the principal surface 100Ba of the seat portion 100B in the base-side direction. Furthermore, the depressed portion BDD2 is located apart from the depressed portion BDD1 in an opposite direction to the direction toward which the tip end of the arrow of the second direction Y is pointing.

The magnetic disk device 1 has a conductive body BL. The conductive body BL is provided in such a manner as to be capable of coming in contact with the container portion BD and the inner cover 14. The conductive body BL is located between the depressed portion BDD2 and the inner cover 14. The conductive body BL is formed with a conductive material, for example, a metallic material. The conductive body BL is formed into, for example, a spherical shape. It is noted that the conductive body BL may be formed into a shape other than the spherical shape.

Figure 9:
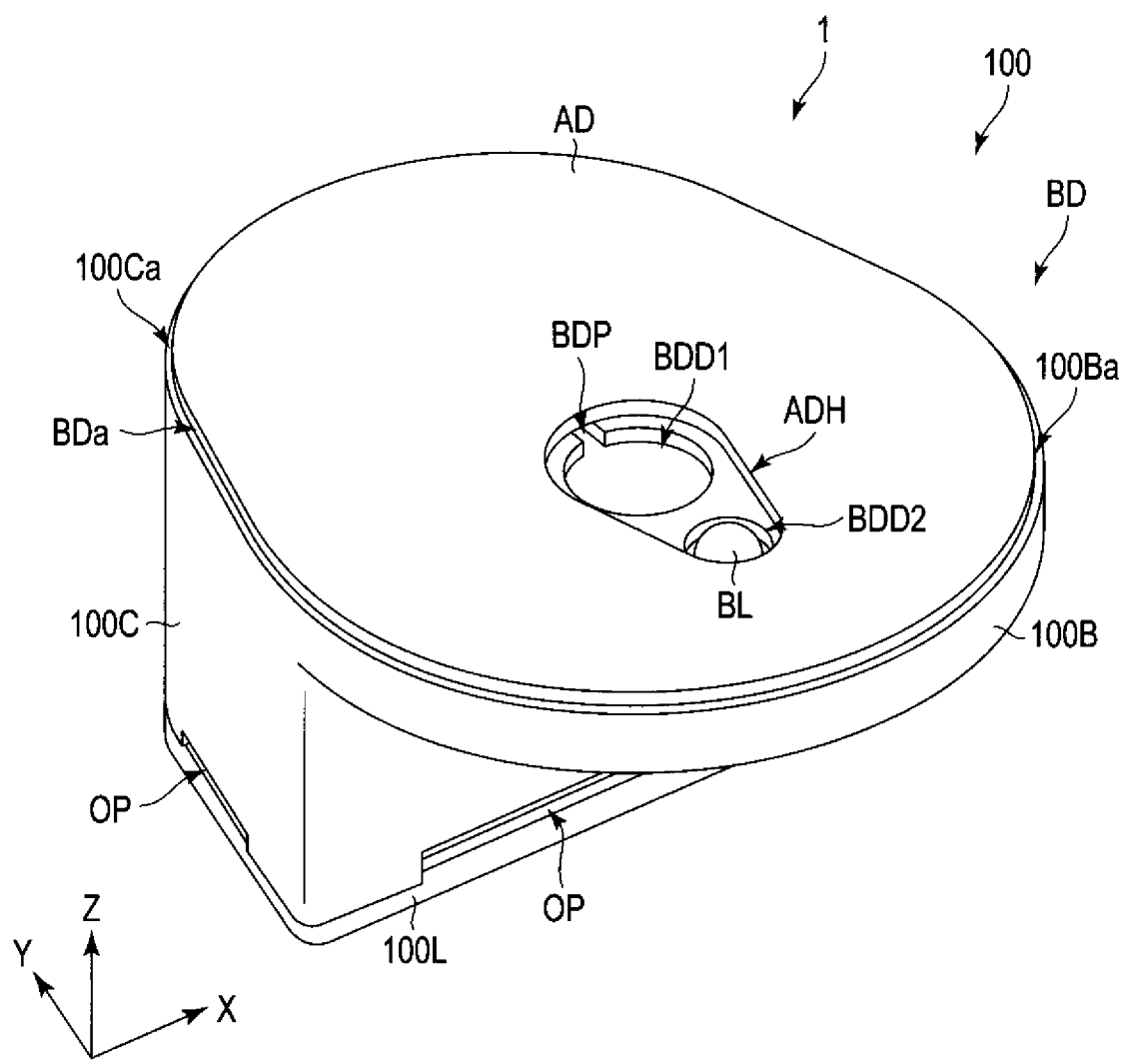
FIG. 9 is a perspective view depicting an example of an adhesive member and the hygroscopic portion according to the second embodiment.

FIG. 9 is a perspective view depicting an example of the adhesive member AD and the hygroscopic portion 100 according to the second embodiment.

In the example depicted in FIG. 9, the through-hole ADH of the adhesive member AD is superimposed on the depressed portions BDD1 and BDD2. In the example depicted in FIG. 5, a magnitude of the through-hole ADH is larger than those of the depressed portions BDD1 and BDD2 in an X-Y plane. The diameter of the depressed portion BDD1 is larger than that of the depressed portion BDD2. It is noted that the diameter of the depressed portion BDD1 may be smaller than or equal to that of the depressed portion BDD2. The depressed portion BDD2 is apart from the depressed portion BDD1 in the opposite direction to the direction in which the tip end of the arrow of the second direction Y is pointing. The conductive body BL is accommodated in the depressed portion BDD2.

Figure 10:
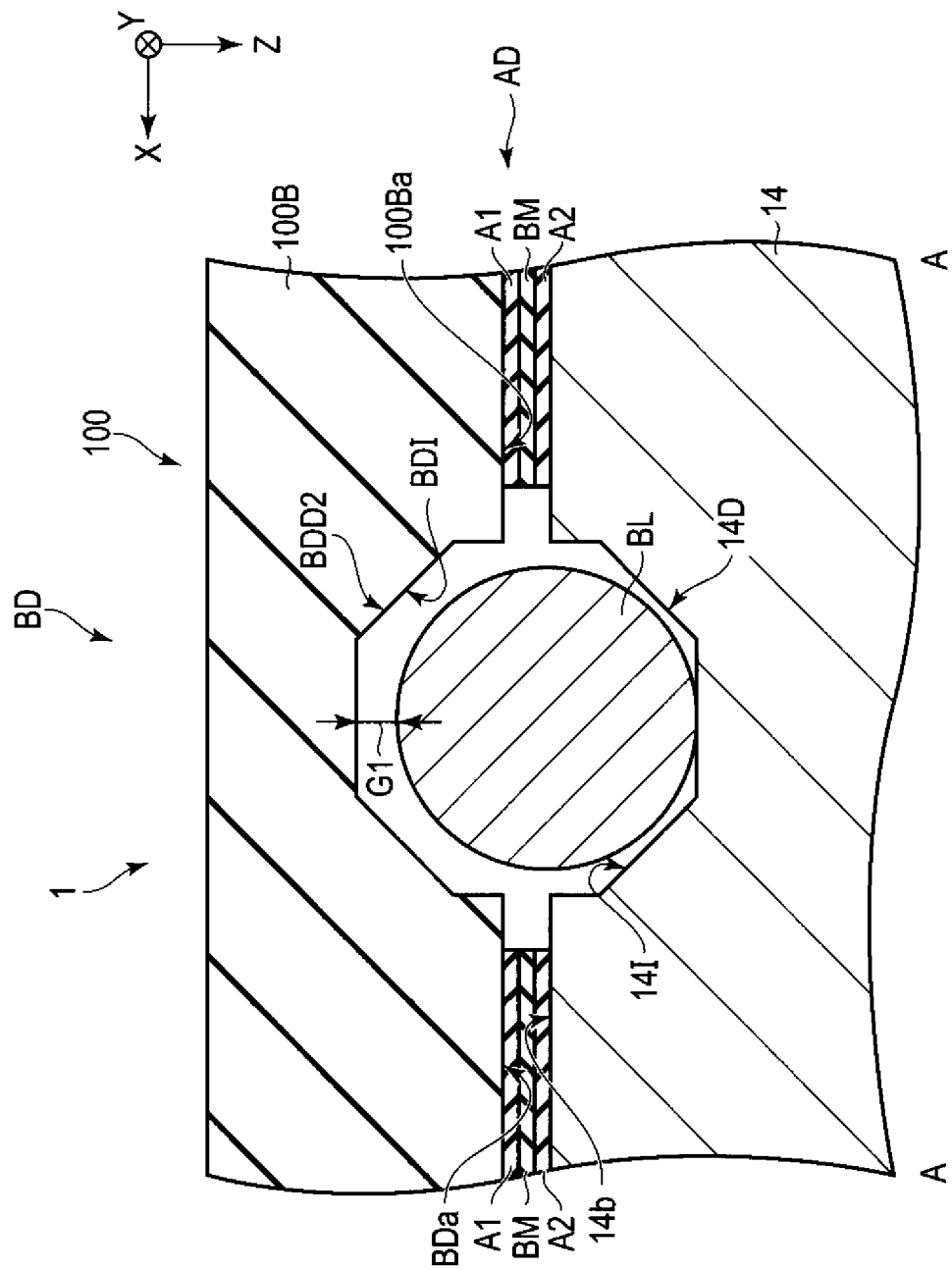
FIG. 10 is a cross-sectional view taken along A-A depicted in FIG. 8 and schematically depicting an example of configurations of the hygroscopic portion, the adhesive member, and an inner cover.

FIG. 10 is a cross-sectional view taken along A-A depicted in FIG. 8 and schematically depicting an example of configurations of the hygroscopic portion 100, the adhesive member AD, and the inner cover 14.

In an example depicted in FIG. 10, the adhesive member AD is formed by stacking an adhesive layer A1, a base material BM, and an adhesive layer A2 in this order in the third direction Z. The adhesive layers A1 and A2 are formed with an adhesive substance. The adhesive member AD is located between the container portion BD and the inner cover 14, adhesively bonds to the principal surface BDa of the container portion BD by the adhesive layer A1, and adhesively bonds to the facing surface 14b of the inner cover 14 by the adhesive layer A2. In the example depicted in FIG. 10, the adhesive member 10 is located between the seat portion 100B and the inner cover 14, adhesively bonds to the principal surface 100Ba of the seat portion 100B by the adhesive layer A1, and adhesively bonds to the facing surface 14b of the inner cover 14 by the adhesive layer A2.

The inner cover 14 has a depressed portion 14D that faces the depressed portion BDD2 of the container portion BD in the hygroscopic portion 100 via the through-hole ADH. In other words, the depressed portion 14D faces the through-hole ADH and the depressed portion BDD2. The depressed portion 14D is formed by depressing the facing surface 14b of the inner cover 14 in a cover-side direction. The conductive body BL is located between the depressed portions 14D and BDD2. In other words, the conductive body BL is located in a space surrounded by the depressed portions 14D and BDD2. Part of the facing surface 14b around the depressed portion 14D and part of the principal surface 100Ba around the depressed portion BDD2 are closely, adhesively bonded to each other by the adhesive member AD so as to prevent the conductive body BL from falling off. The conductive body BL is apart from an inner wall 14I of the depressed portion 14D or an inner wall BDI of the depressed portion BDD2 with a gap given therebetween. In the example depicted in FIG. 10, the conductive body BL comes in contact with the inner wall 14I of the depressed portion 14D and is apart from the inner wall BDI of the depressed portion BDD2 with a gap G1 given therebetween in the third direction Z. For example, when the magnetic disk device 1 is inverted in the third direction Z in the example depicted in FIG. 10, the conductive body BL can come in contact with the inner wall BDI of the depressed portion BDD2 and be apart from the inner wall 14I of the depressed portion 14D with the gap G1 given therebetween in the third direction Z. Furthermore, the conductive body BL can alternately come in contact with the inner wall BDI of the depressed portion BDD2 and the inner wall 14I of the inner cover 14 by driving the magnetic disk device 1 to produce vibration or the like. The conductive body BL receives static electricity from the hygroscopic portion 100 when coming in contact with the inner wall BDI, and releases the static electricity received from the hygroscopic portion 100 to the inner cover 14 when coming in contact with the inner wall 14I.

According to the second embodiment, the magnetic disk device 1 further has the conductive body BL. The conductive body BL is accommodated between the depressed portion 14D formed in the facing surface 14b of the inner cover 14 and the depressed portion BDD2 formed in the principal surface BDa of the container portion BD of the hygroscopic portion 100. The conductive body BL is apart from the inner wall 14I of the depressed portion 14D or the inner wall BDI of the depressed portion BDD2 with the gap given therebetween. The conductive body BL can alternately come in contact with the facing surface 14b of the inner cover 14 and the principal surface BDa of the container portion BD by driving the magnetic disk device 1 to produce vibration or the like. The conductive body BL receives the static electricity with which the hygroscopic portion 100 is charged when coming in contact with the inner wall BDI of the depressed portion BDD2, and releases the static electricity received from the hygroscopic portion 100 to the inner cover 14 when coming in contact with the inner wall 14I of the depressed portion 14D, thereby making it possible to release the static electricity with which the hygroscopic portion 100 is charged to ground via the inner cover 14, the base 12, and the like. Accordingly, the magnetic disk device 1 can prevent the static electricity with which the hygroscopic portion 100 is charged from being discharged to the head 17. The magnetic disk device 1 can, therefore, improve the reliability.

Moreover, since the conductive body BL is apart from the inner wall 14I of the depressed portion 14D or the inner wall BDI of the depressed portion BDD2 with the gap given therebetween, it is possible to reduce the repelling force generated on the base side by contact of the conductive body BL with the inner walls 14I and BDI. Accordingly, the magnetic disk device 1 is capable of reducing the force that possibly causes peel-off of the adhesive member AD. The magnetic disk device 1 can, therefore, improve the reliability.

Second Modification

The magnetic disk device 1 in a second modification differs in the configuration of the hygroscopic portion 100 from the magnetic disk devices 1 in the first embodiment, the second embodiment, and the first modification.

Figure 11:
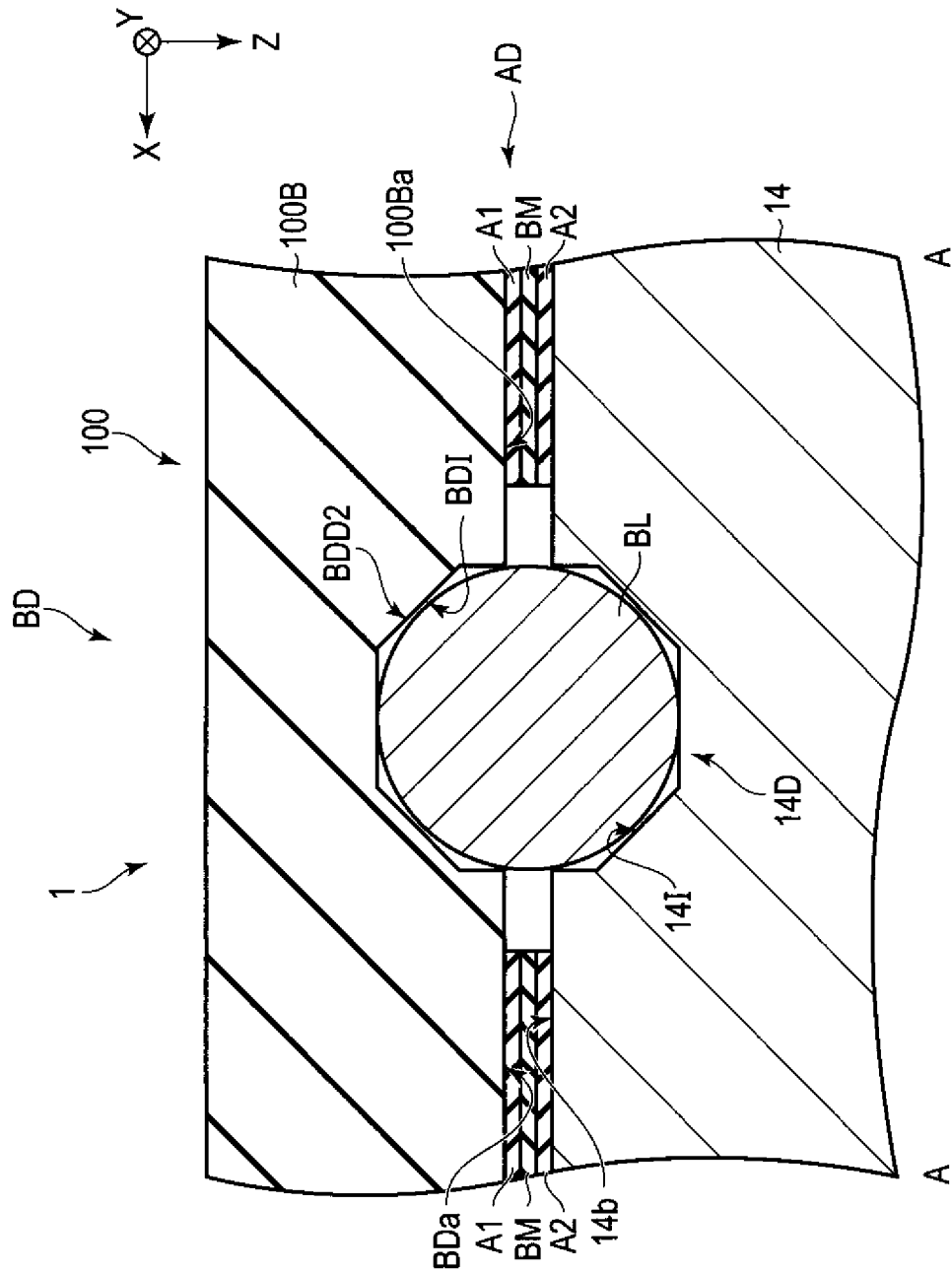
FIG. 11 is a cross-sectional view schematically depicting an example of configurations of a hygroscopic portion, an adhesive member, and an inner cover according to a second modification.

FIG. 11 is a cross-sectional view schematically depicting an example of configurations of the hygroscopic portion 100, the adhesive member AD, and the inner cover 14 according to the second modification. FIG. 11 is a cutaway view along A-A depicted in FIG. 8 and depicts the example of the configurations of the hygroscopic portion 100, the adhesive member AD, and the inner cover 14.

The conductive body BL comes in contact with the inner wall 14I of the depressed portion 14D and the inner wall BDI of the depressed portion BDD2.

According to the second modification, the magnetic disk device 1 has the conductive body BL. The conductive body BL comes in contact with the inner wall 14I of the depressed portion 14D and the inner wall BDI of the depressed portion BDD2. The magnetic disk device 1 can release the static electricity with which the hygroscopic portion 100 is charged to ground via the inner cover 14, the base 12, and the like. Accordingly, the magnetic disk device 1 can prevent the static electricity with which the hygroscopic portion 100 is charged from being discharged to the head 17. The magnetic disk device 1 can, therefore, improve the reliability.

Third Modification

The magnetic disk device 1 in a third modification differs in the configuration of the hygroscopic portion 100 from the magnetic disk devices 1 in the first embodiment, the second embodiment, the first modification, and the second modification.

Figure 12:
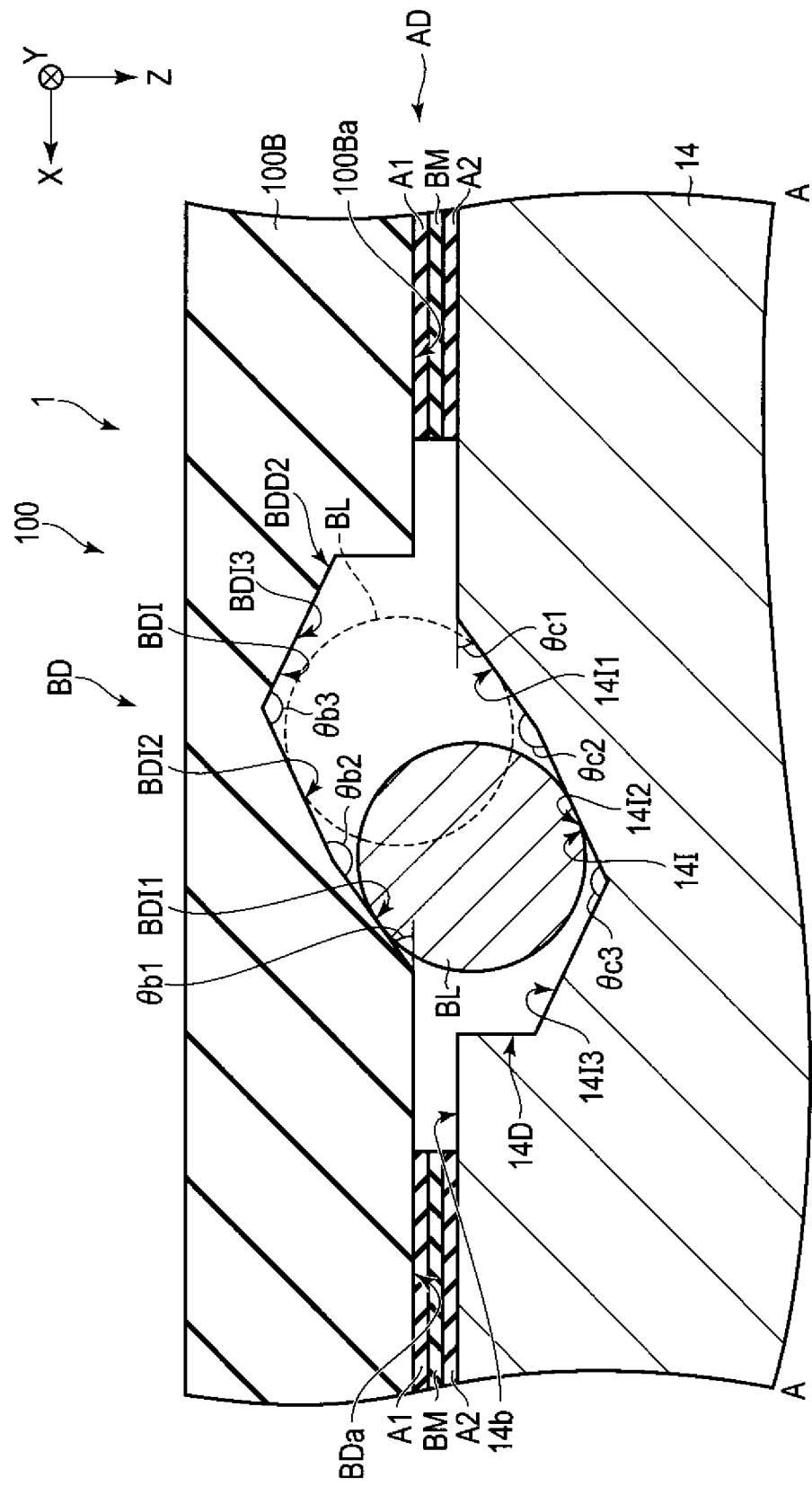
FIG. 12 is a cross-sectional view schematically depicting an example of configurations of a hygroscopic portion, an adhesive member, and an inner cover according to a third modification.

FIG. 12 is a cross-sectional view schematically depicting an example of configurations of the hygroscopic portion 100, the adhesive member AD, and the inner cover 14 according to the third modification. FIG. 12 is a cutaway view along A-A depicted in FIG. 8 and depicts the example of the configurations of the hygroscopic portion 100, the adhesive member AD, and the inner cover 14. In FIG. 12, a position to which the conductive body BL indicated by a solid-line circle moves is indicated by a dotted-line circle when the magnetic disk device 1 is inverted in the third direction Z.

The inner wall 14I of the depressed portion 14D and the inner wall BDI of the depressed portion BDD2 are formed such that the conductive body BL is movable obliquely while coming in contact with the inner walls 14I and BDI. In the example depicted in FIG. 12, the inner wall BDI of the depressed portion BDD2 has inner walls BDI1, BDI2, and BDI3. The inner wall BDI1 is inclined at an angle $\theta b1$ with respect to the principal surface BDa of the container portion BD, for example, the first direction X. For example, the angle $\theta b1$ is greater than 0° and equal to or smaller than 90°. The inner wall BDI2 is inclined at an angle $\theta b2$ with respect to the inner wall BDI1. For example, the angle $\theta b2$ is greater than 120° and equal to or smaller than 180°. It is noted that the angle $\theta b2$ may be greater than 90° and equal to or smaller than 180°. The inner wall BDI3 is inclined at an angle $\theta b3$ with respect to the inner wall BDI2. For example, the angle θb3 is greater than 90° and equal to or smaller than 120°. It is noted that the angle θb3 may be greater than 90° and equal to or smaller than 180°. The inner wall 14I of the depressed portion 14D has inner walls 14I1, 14I2, and 14I3. The inner wall 14I1 is inclined at an angle θc1 with respect to the facing surface 14b of the inner cover 14, for example, the first direction X. For example, the angle θc1 is greater than 0° and equal to or smaller than 90°. The inner wall 14I2 is inclined at an angle θc2 with respect to the inner wall 14I1. For example, the angle θc2 is greater than 120° and equal to or smaller than 180°. It is noted that the angle θc2 may be greater than 90° and equal to or smaller than 180°. The inner wall 14I3 is inclined at an angle θc3 with respect to the inner wall 14I2. For example, the angle θc3 is greater than 90° and equal to or smaller than 120°. It is noted that the angle θc3 may be greater than 90° and equal to or smaller than 180°. The inner wall 14I1 faces the inner wall BDI1. For example, the inner wall 14I1 is formed in parallel to the inner wall BDI1. It is noted that the inner walls 14I1 and BDI1 are not necessarily formed in parallel to each other. The inner wall 14I2 faces the inner wall BDI2. For example, the inner wall 14I2 is formed in parallel to the inner wall BDI2. It is noted that the inner walls 14I2 and BDI2 are not necessarily formed in parallel to each other. The inner wall 14I3 faces the inner wall BDI3. For example, the inner wall 14I3 is formed in parallel to the inner wall BDI3. It is noted that the inner walls 14I3 and BDI3 are not necessarily formed in parallel to each other.

The conductive body BL comes in contact with the inner wall 14I of the depressed portion 14D and the inner wall BDI of the depressed portion BDD2. In the example depicted in FIG. 12, the conductive body BL comes in contact with the inner walls 14I2 and BDI1 between the inner wall 14I of the depressed portion 14D and the inner wall BDI of the depressed portion BDD2. In the example depicted in FIG. 12, when the magnetic disk device 1 is inverted in the third direction Z, the conductive body BL moves along the inner walls 14I1 and BDI2 from the position indicated by the solid-line circle to the position indicated by the dotted-line circle while coming in contact with the inner walls 14I and BDI.

According to the third modification, the inner wall 14I of the depressed portion 14D and the inner wall BDI of the depressed portion BDD2 are formed such that the conductive body BL is movable obliquely while coming in contact with the inner walls 14I and BDI. The magnetic disk device 1 can release the static electricity with which the hygroscopic portion 100 is charged to ground via the inner cover 14, the base 12, and the like. Accordingly, the magnetic disk device 1 can prevent the static electricity with which the hygroscopic portion 100 is charged from being discharged to the head 17. Furthermore, the magnetic disk device 1 is capable of reducing the force that possibly causes the peel-off of the adhesive member AD. The magnetic disk device 1 can, therefore, improve the reliability.

While it is described that the low-density gas (inert gas), which is, for example, helium gas, lower in density than the air is filled into the casing 10 in the embodiments and the modifications described above, the configurations of the embodiments and the modifications are also applicable to an ordinary magnetic disk device that is not filled with the inert gas. The ordinary magnetic disk device has a structure, for example, in which not the two covers of the inner cover and the outer cover but one top cover closes the opening of the base.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a casing having a box-like base that has a bottom wall and a cover that has a first surface facing the bottom wall;
   a magnetic disk provided in the casing;
   a head configured to write data to the magnetic disk and to read data from the magnetic disk;
   an actuator assembly that supports the head in the casing;
   a conductive container on the first surface of the cover; and
   a conductive body in contact with the conductive container and the cover,
   wherein
   the conductive body is formed integrally with the conductive container, and
   the conductive body is a plate spring and has a projection portion that protrudes from the plate spring toward the cover and makes contact with the cover.

2. The magnetic disk device according to claim 1, wherein the conductive container is made of a conductive resin.

3. The magnetic disk device according to claim 1, wherein the conductive container accommodates therein a hygroscopic material.

4. A magnetic disk device comprising:
   a casing having a box-like base that has a bottom wall and a cover that has a first surface facing the bottom wall;
   a magnetic disk provided in the casing;
   a head configured to write data to the magnetic disk and to read data from the magnetic disk;
   an actuator assembly that supports the head in the casing;
   a conductive container on the first surface of the cover;
   a conductive body in contact with the conductive container and the cover; and
   an adhesive member that adhesively bonds the first surface to the conductive container and that has a through-hole, wherein
   the conductive body is located in the through-hole.

5. The magnetic disk device according to claim 4, wherein
   the cover has a first depressed portion that is formed in the first surface of the cover and that faces the through-hole,
   the container has a second depressed portion that is formed in a second surface of the container facing the first surface of the cover and that faces the through-hole, and
   the conductive body is located between the first depressed portion and the second depressed portion.

6. The magnetic disk device according to claim 5, wherein the conductive body is spaced apart from one of the first depressed portion and the second depressed portion.

7. The magnetic disk device according to claim 5, wherein the conductive body comes in contact with both the first depressed portion and the second depressed portion.

8. The magnetic disk device according to claim 7, wherein the first depressed portion has an inclined first inner wall, and the second depressed portion has a second inner wall inclined in a same direction to a direction in which the first inner wall is inclined, and the conductive body comes in contact with different portions of the first inner wall and the second inner wall as the conductive body moves within a space between the first inner wall and the second inner wall.

9. The magnetic disk device according to claim 4, wherein the conductive body has a spherical shape.

10. The magnetic disk device according to claim 4, wherein
the adhesive member is a double-sided tape.

11. A magnetic disk device comprising:
a casing having a box-like base that has a bottom wall and a cover that has a first surface facing the bottom wall;
a magnetic disk provided in the casing;
a head configured to write data to the magnetic disk and to read data from the magnetic disk;
an actuator assembly that supports the head in the casing;
a conductive container on the first surface of the cover;
a conductive body in contact with the conductive container and the cover; and
a flexible printed circuit board electrically connected to the actuator assembly in the casing, wherein
the conductive container is located between the actuator assembly and the flexible printed circuit board.

12. A magnetic disk device comprising:
a casing having a box-like base that has a bottom wall and a cover that has a first surface facing the bottom wall;
a magnetic disk rotatably provided in the casing;
a head configured to write data to the magnetic disk and to read data from the magnetic disk;
an actuator assembly that supports the head in the casing;
a flexible printed circuit board electrically connected to the actuator assembly;
a conductive container for storing hygroscopic material, adhesively bonded to the first surface by an insulating adhesive member and located between the actuator assembly and the flexible printed circuit board; and
a conductive body that is formed integrally with the container and comes in contact with the cover.

13. The magnetic disk device according to claim 12, wherein the conductive container includes an opening through which gas can flow into from the casing.

14. The magnetic disk device according to claim 12, wherein the conductive body is a plate spring that extends from the conductive body and has a projection that comes into contact with the cover.

15. A magnetic disk device comprising:
a casing having a box-like base that has a bottom wall and a cover that has a first surface facing the bottom wall;
a magnetic disk rotatably provided in the casing;
a head configured to write data to the magnetic disk and to read data from the magnetic disk;
an actuator assembly that supports the head in the casing;
a flexible printed circuit board electrically connected to the actuator assembly;
a conductive container for storing hygroscopic material, adhesively bonded to the first surface by an insulating adhesive member and located between the actuator assembly and the flexible printed circuit board; and
a conductive body located between the first surface of the cover and the conductive container.

16. The magnetic disk device according to claim 15, wherein the conductive container includes an opening through which gas can flow into from the casing.

17. The magnetic disk device according to claim 15, wherein
the conductive body is a spherical ball that is arranged between a first depressed portion of the first surface of the cover and a second depressed portion of the container.

18. The magnetic disk device according to claim 17, wherein
the spherical ball is in contact with both the first depressed portion and the second depressed portion.

* * * * *